United States Patent [19]
Wei

[11] Patent Number: 5,701,415
[45] Date of Patent: *Dec. 23, 1997

[54] METHOD FOR CREATING STUB FILE SUPPORTING REMOTE PROCEDURE CALLS BY GENERATING COMMON CODE INCLUDING CODE UTILIZED BY STUB PROCEDURES TO INVOKE PLURALITY OF SERVICE PROCEDURES

[75] Inventor: Yi-Hsiu Wei, Austin, Tex.

[73] Assignee: International Business Machines Corporation, Armonk, N.Y.

[*] Notice: The term of this patent shall not extend beyond the expiration date of Pat. No. 5,526,491.

[21] Appl. No.: 619,111

[22] Filed: Mar. 20, 1996

Related U.S. Application Data

[63] Continuation of Ser. No. 949,294, Sep. 22, 1992, Pat. No. 5,526,491.

[51] Int. Cl.$^6$ .................................................. G06F 13/00
[52] U.S. Cl. ............................... 395/200.09; 395/684
[58] Field of Search .................... 395/200.01, 200.03, 395/200.09, 200.02, 200.12, 600, 650, 700, 610, 682, 684, 685

[56] References Cited

U.S. PATENT DOCUMENTS

| | | | |
|---|---|---|---|
| 5,128,878 | 7/1992 | Gore et al. | 395/502 |
| 5,187,790 | 2/1993 | East et al. | 395/684 |
| 5,218,699 | 6/1993 | Brandle et al. | 395/684 |
| 5,247,676 | 9/1993 | Ozur et al. | 395/684 |
| 5,249,290 | 9/1993 | Heizer et al. | 395/675 |
| 5,249,293 | 9/1993 | Schreiber et al. | 395/200.03 |
| 5,287,504 | 2/1994 | Carpenter et al. | 395/617 |
| 5,307,490 | 4/1994 | Davidson et al. | 395/200.03 |
| 5,526,491 | 6/1996 | Wei | 395/684 |

OTHER PUBLICATIONS

"In Praise of Remote Procedure Calls", by Barry Lance, Byte, Mar. 1991, p. 338, vol. 16, No. 3.
"A Model for HP-UX Shared Libraries Using Shared Memory on HP Precision Architecture Computers", by Mortelli Anastasia, Hewlett-Packard Journal, v40, n5, p. 86(5), Oct. 1989.
"Shared Libraries for HP-UX", by Contant, Cary, Hewlett-Packard Journal, v43, n3, p. 46(8), Jun. 1992.
"Go Forth and Multiply", by McLachlan, Gordon, LAN Computing, v3, n5, p. 19(3), May 1992.

*Primary Examiner*—Moustafa M. Meky
*Attorney, Agent, or Firm*—David A. Mims, Jr.; Brian F. Russell; Andrew J. Dillon

[57] ABSTRACT

A stub file to be utilized by remote procedure calls in a computer network. The stub file comprises a common code, wherein the common code contains shared code for a plurality of stub procedures. A block identifier is passed from the application program to the common code within the stub file and is utilized in conjunction with the common code to invoke the appropriate remote procedure.

9 Claims, 4 Drawing Sheets

METHOD FOR CREATING STUB FILE SUPPORTING REMOTE PROCEDURE CALLS BY GENERATING COMMON CODE INCLUDING CODE UTILIZED BY STUB PROCEDURES TO INVOKE PLURALITY OF SERVICE PROCEDURES

This application is a continuation of application Ser. No. 07/949,294, filed Sep. 22, 1992 now U.S. Pat. No. 5,526,491.

BACKGROUND OF THE INVENTION

1. Technical Field

The present invention relates in general to computer networks, and in particular to remote procedure calls. Still more particularly, the present invention relates to stub files utilized in remote procedure calls.

2. Description of the Related Art

Remote procedure calls allow for communication between application programs across a computer network. When a remote procedure is invoked, parameters are passed across the computer network to the application program which will execute the procedure. When the procedure finishes and produces its results, the results are then passed back to the calling application program, where execution of the calling application program resumes. Typically, the calling application program is called the client, and the application program which executes the procedure is called the server. As used herein, the term procedure will be used in a generic sense; program segments which are referred to in particular instances as procedures, functions, and subroutines will all be referred to herein as procedures.

Contemporary remote procedure calls utilize stub files to generate and transport messages which carry the parameters from the client to the server, and then carry the results back to the client. These stub files are generated by a compiler, and can demand large amounts of code. In some computer systems, such as personal computers, stub files which demand large amounts of code may cause the speed of procedure execution to decrease due to paging activity. This undesirable performance degradation caused by the large amounts of code may noticeably affect the operations in the computer systems.

Furthermore, the large amounts of code required by contemporary stub files results in the consumption of a large amount of space in memory and direct access storage devices (DASD) within the computer network. Preferably, as much space as possible in memory and DASD should be utilized by application programs. Those skilled in the art will recognize that this optimizes the efficiency and performance of the computer network. Thus, having stub files consume large amounts of space in memory and DASD limits the performance potential of a computer network.

It would therefore be desirable to reduce the size of stub files in a computer network which utilizes remote procedure calls. This would have the desirable effect of increasing the efficiency, space utilization and performance of the computer network.

SUMMARY OF THE INVENTION

It is therefore one object of the present invention to provide a stub file which may be implemented in remote procedure calls.

It is another object of the present invention to provide a stub file which reduces memory and DASD space consumed by the stub file in a computer network.

It is yet another object of the present invention to provide a stub file which improves the efficiency of a computer network.

The foregoing objects are achieved as is now described. A stub file to be utilized by remote procedure calls in a computer network. The stub file comprises a common code, wherein the common code contains shared code for a plurality of stub procedures. A block identifier is passed from the application program to the common code within the stub file and is utilized in conjunction with the common code to invoke the appropriate remote procedure.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
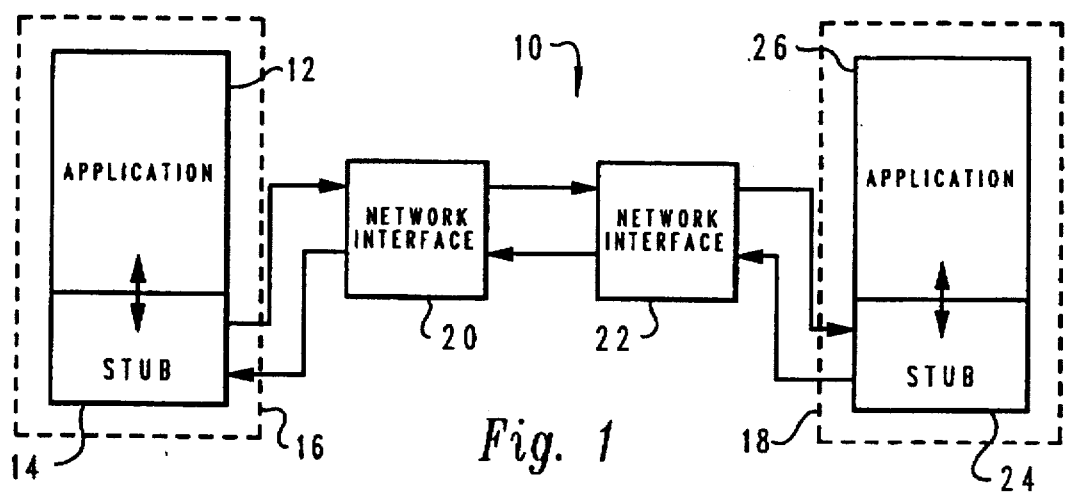
FIG. 1 is a block diagram of a computer network which may be utilized to implement the present invention.

With reference now to the figures and in particular with reference to FIG. 1, a block diagram of a computer network is depicted which may be utilized to implement the present invention. The computer network 10 includes a first application program 12 and a first stub file 14. The first application program 12 and the first stub file 14 are located on a local node 16 of the computer network 10. The local node 16 of computer network 10 is typically known in the art as the "client."

If first application program 12 needs a procedure executed and that procedure resides in a remote node 18 on the computer network 10, first application program 12 makes a local call to first stub file 14. In response to the call, first stub file 14 packages parameters into a message and sends the message through a first network interface 20 and a second network interface 22 to the remote node 18. Those skilled in the art will recognize that remote node 18 is known in the art as the "server."

When the message arrives at the server, a second stub file 24 receives the message and unpacks the parameters from the message. The second stub file 24 then calls a second application program 26 and passes the parameters to the second application program 26. The second application program 26 executes the requested process and then passes the results to the second stub file 24. The second stub file 24 packages the results into a message and transmits the message back through the second interface 22 and the first interface 20 to first stub file 14. Finally, the first stub file 14 receives the message, unpacks the message, and passes the results to the first application program 12.

This process is known in the art as a remote procedure call. A remote procedure call is designed to be transparent to the client. In other words, the first application program 12 is unaware that the called process is executed by an application program on a different computer.

Figure 2:
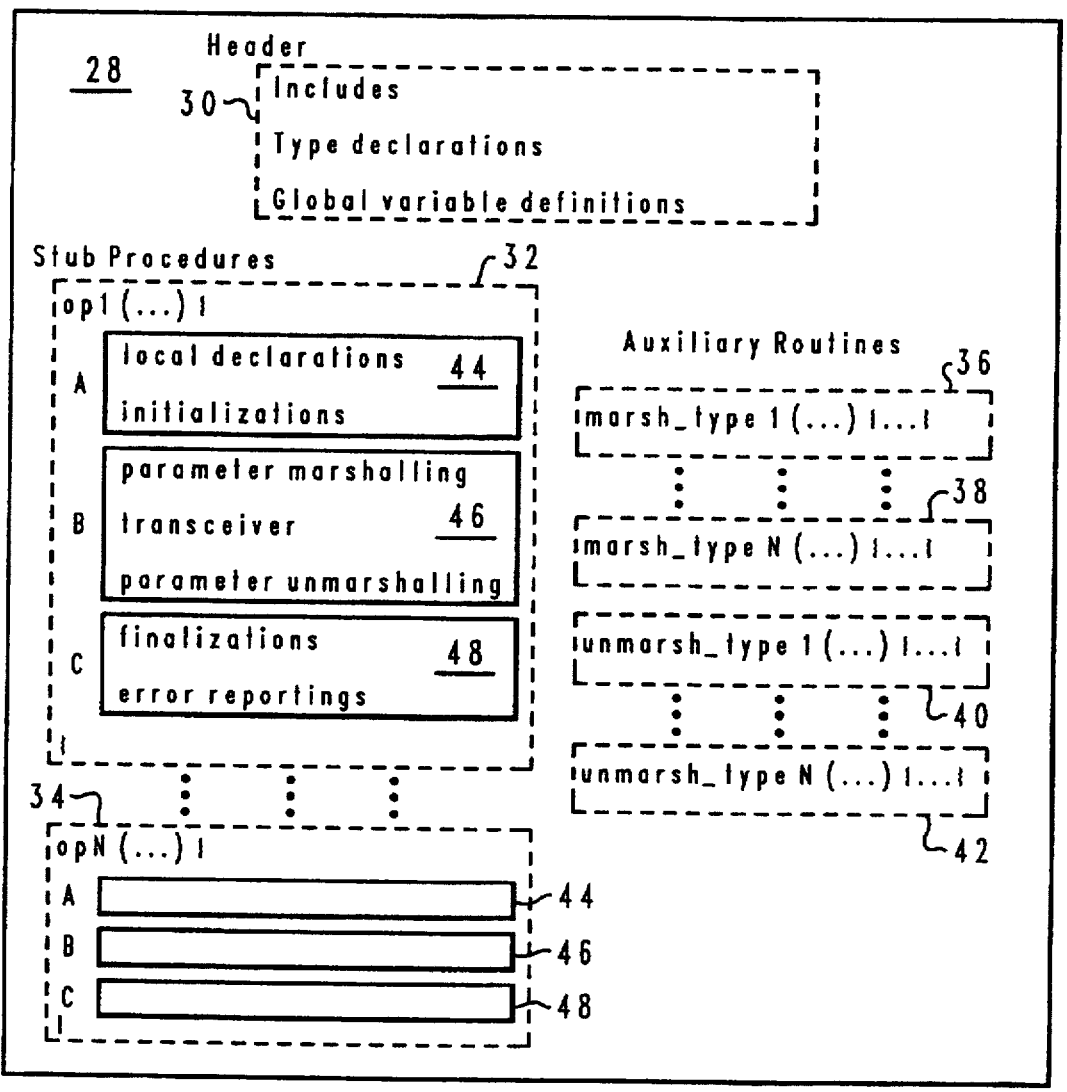
FIG. 2 is a block diagram illustrating a stub file according to the prior art.

FIG. 2 is a block diagram illustrating a stub file according to the prior art. As can be seen, stub file 28 consists of a header 30, a plurality of stub procedures 32, 34, and a plurality of auxiliary routines 36, 38, 40, 42. The ellipse indicate multiple stub procedures and auxiliary routines may exist in the stub file 28. The header 30 comprises standard includes, type declarations and global variable definitions. Each of the plurality of stub procedures 32, 34 correspond to an operation called by an application program. The plurality of auxiliary routines 36, 38, 40, 42 may be generated for packaging, or "marshalling" and "unmarshalling", structured data such as pointers to record.

Each of the plurality of stub procedures 32, 34 includes, among other items, three blocks of code. The first block 44, labeled A, includes code for defining and initializing local variables. The second block 46, labeled B, includes code for packaging, or "marshalling", input parameters, transport function invocations, and unpackaging, or "unmarshalling", results or output parameters. Finally, the third block 48, labeled C, includes code for memory reclamation and error reporting.

Figure 3:
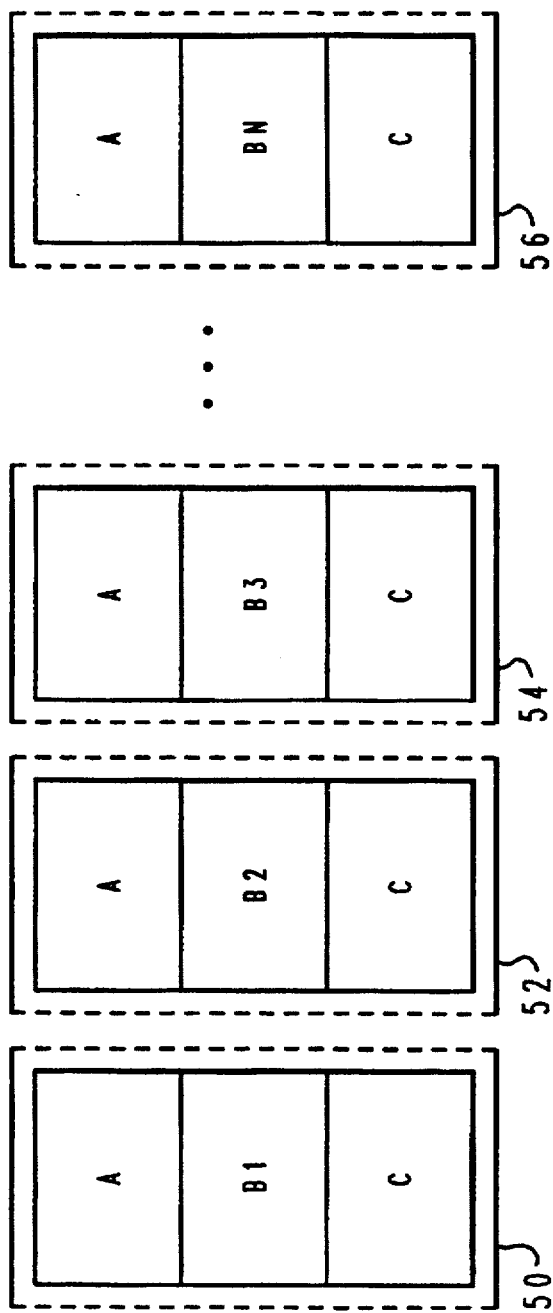
FIG. 3 is a block diagram illustrating portions of multiple stub procedures according to the prior art.

Referring to FIG. 3, a block diagram depicts portions of multiple stub procedures according to the prior art. As can be seen, each of the multiple stub procedures 50, 52, 54, 56 contain the code blocks A, B, and C. The ellipse indicate there may be a multiple number of stub procedures.

When two or more operations have the same set of operation attributes, the corresponding stub procedures will have identical code in blocks A and C. This is indicated in FIG. 3 by each of the stub procedures having a block A and a block C. Thus, for those stub procedures, the code in blocks A and C may be shared. By sharing the code in blocks A and C, the size of each of the stub procedures may be reduced.

Figure 4A:
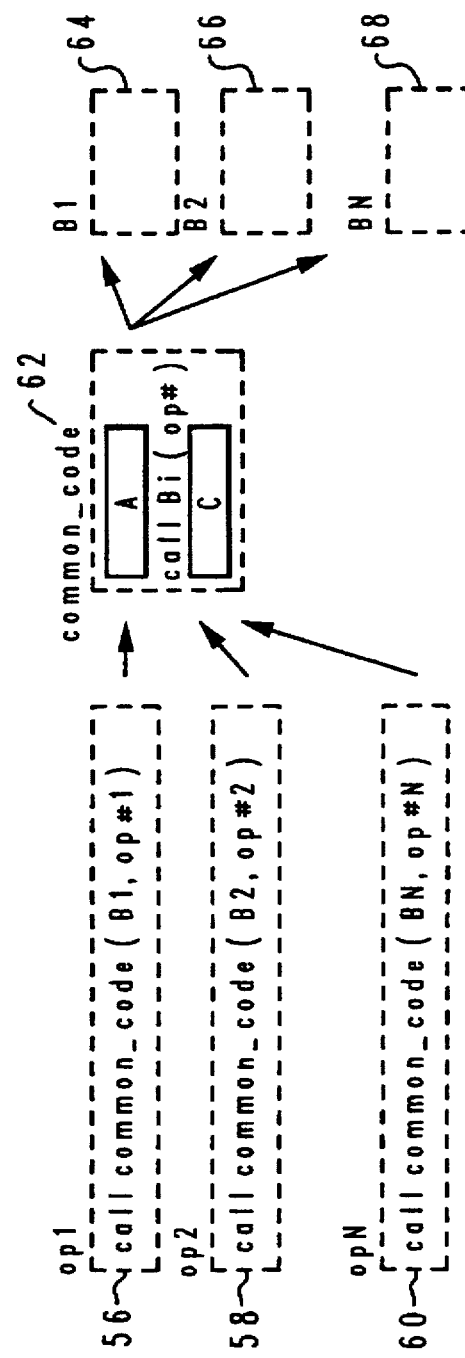
FIGS. 4A-4B are block diagrams illustrating the concept of multiple stub procedures utilizing a common code in order to reduce the size of each of the multiple stub procedures.

FIG. 4a is a block diagram illustrating the concept of sharing the code in blocks A and C. Command stub procedures 56, 58, 60 call a common code 62 which contains the code from blocks A and C. When one of the command stub procedures 56, 58, 60 calls the common code 62, a block B pointer is passed to the common code 62 indicating which appropriate B block is to be called. One of the B blocks 64, 66, 68 is then called by the common code 62.

Parameter numbers and parameter data types vary from operation to operation. In order to make the common code 62 appear "common" to all operations, the common code 62 in the preferred embodiment has a generic list of formal parameters that all operations accept. To be generic, the list of formal parameters must have an adequate number of parameters with data types compatible to the corresponding data types in the operations. Furthermore, the call statement to the different B blocks in the common code 62 must be generic too. The generic call statement must have a variable name in order to be dynamically bound to the block B pointer. Finally, with the common code 62, the code in the B blocks is not able to access the local variables defined in block A. Thus, in the preferred embodiment, the variables utilized in only the B blocks are defined in the corresponding B blocks, and the variables used in both the A and B blocks are defined in the A block and then passed to the B block.

In addition to sharing the code from blocks A and C, in certain situations the code from block B may be shared. This occurs when certain operations have the same input and output parameters of the same data types. This means the marshalling and unmarshalling code in block B in each of the stub procedures will be the same. The only difference between the two routines is the operation number used to acquire the handle for invoking the remote service procedure. Thus, a single B code may be shared if different operation numbers are provided for different remote procedure calls.

For example, in FIG. 3, stub procedure 50 has an operation number of 1, and stub procedure 52 has an operation number of 2. If these two stub procedures have the same input and output parameters of the same data types, the code in each of their respective B blocks is identical. Therefore, the two stub routines 50, 52 may share the code in B, provided a different operation number is supplied for the different remote procedure calls.

Figure 4B:
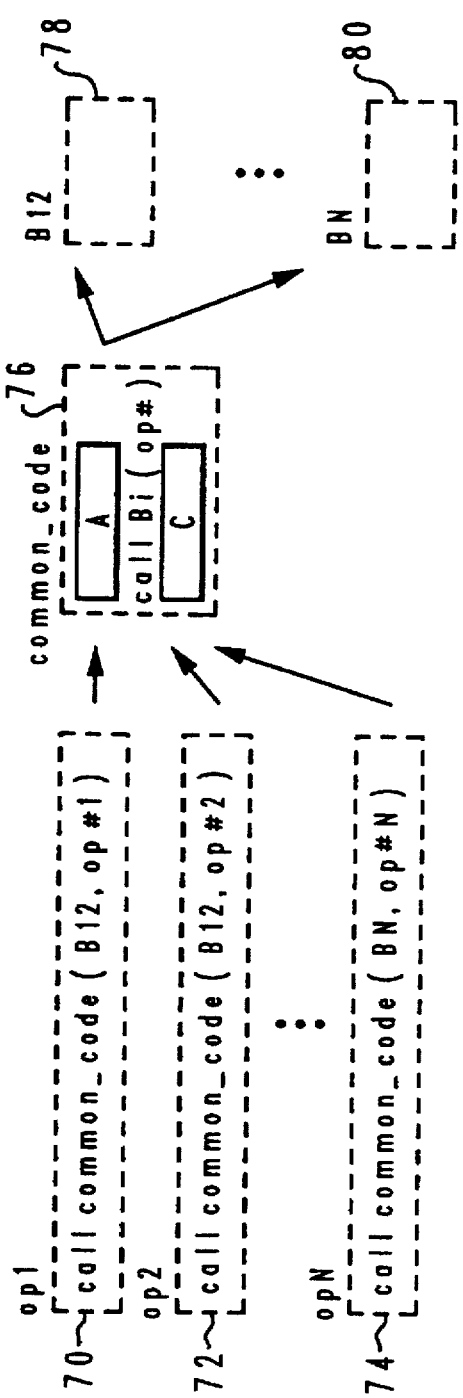

Referring now to FIG. 4b, a block diagram illustrates the concept of a plurality of stub procedures 70, 72, 74 sharing code from blocks A, B and C. One of the plurality of stub procedures 70, 72, 74 calls common code 76 and passes a B block pointer ($B_i$). The B block pointer indicates which shared B code is to be called. The common code 76 then calls the appropriate shared B block from the plurality of B blocks 78, 80 by utilizing the B block pointer. For example, in FIG. 4b, operations 1 and 2 share B code, and this is depicted by block B12. The B block pointer, B12, is included in the each of the call statements for operations 1 and 2.

Finally, the size of the stub file may be reduced even more by utilizing a menu structure for invoking the various B blocks and eliminating the command stub procedures. In the preferred embodiment, a menu structure is accomplished by utilizing a conditional construct switch statement in the common code. The command stub procedures are eliminated in the preferred embodiment by utilizing a macro definition in a generated header file included in front of the application program. Therefore, when the application program is complied, the macro definition substitutes the original stub procedure call with a call to the common code.

Figure 5:
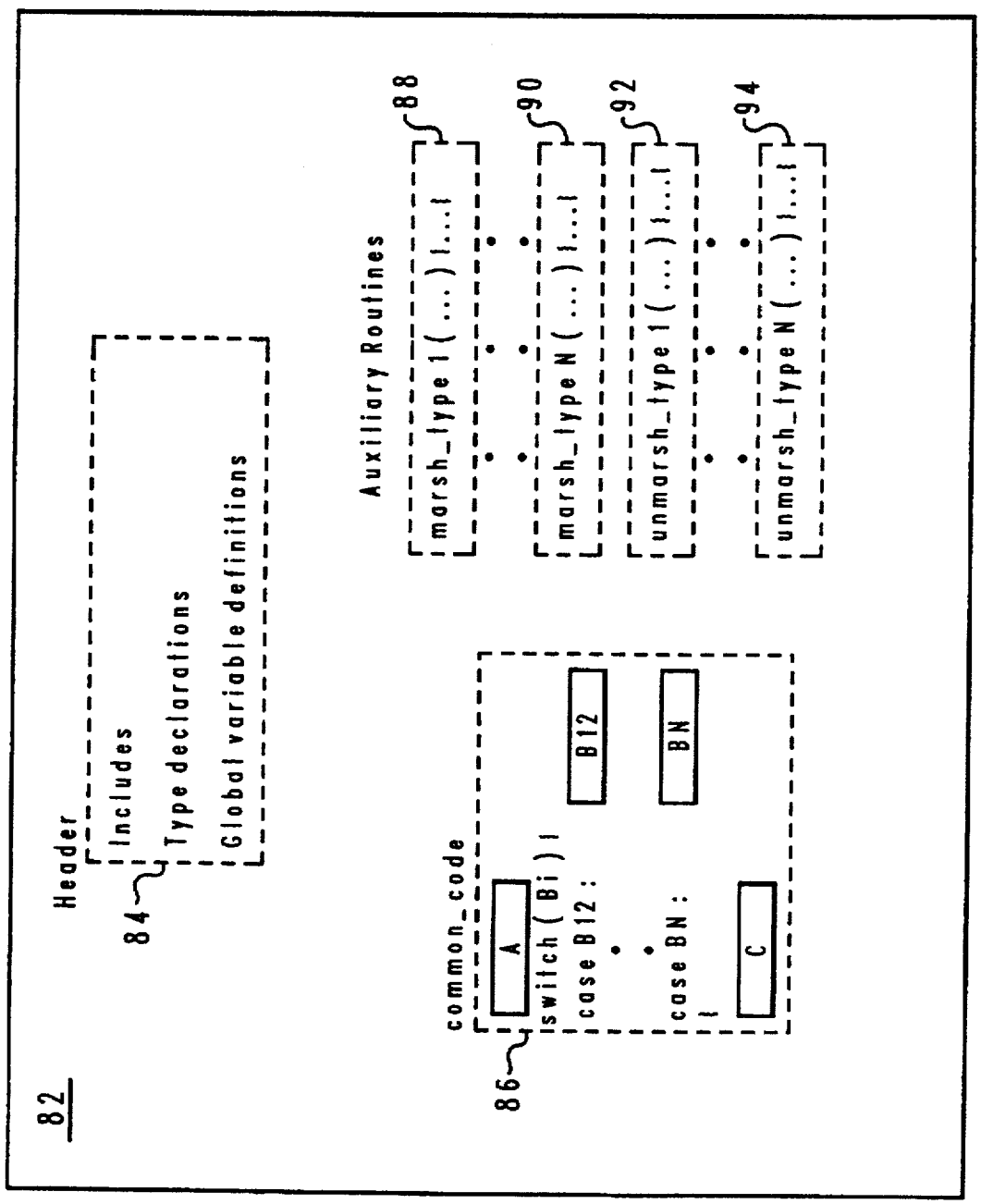
FIG. 5 is a block diagram illustrating a stub file according to the present invention.

FIG. 5 is a block diagram depicting a stub file according to the present invention. As can be seen, stub file 82 includes a header 84, common code 86, and a plurality of auxiliary routines 88, 90, 92, 94. The ellipse indicate multiple auxiliary routines may exist in the stub file 82.

The common code 86 includes the shared code from blocks A and C, and has the B blocks merged into common code 86. A block B identifier, instead of the B block pointer, is specified at the call statement to common code 84 in macro definitions to select the appropriate B block. A conditional construct switch statement is utilized in the common code to select the appropriate B block. The same B block identifier may be utilized by multiple remote procedure call statements to different remote operations that share the same block B. As a result, a single common code 86 exists in the stub file and represents all stub procedures.

Upon the foregoing, those skilled in the art will appreciate that Applicant has provided a structure for stub procedures which greatly reduces the size of the stub procedures. Although the invention has been described with reference to stub procedures at a local node, the invention may also be utilized with stub procedures at a remote node on a computer network.

While the invention has been particularly shown and described with reference to a preferred embodiment, it will be understood by those skilled in the art that various changes in form and detail may be made therein without departing from the spirit and scope of the invention.

I claim:

1. A memory within a computer network for storing data for access by an application program having remote procedure calls, comprising:
   a stub file stored within said memory, said stub file including one or more stub procedures for invoking a plurality of service procedures available on said computer network, and including:
      a common code block including initialization and finalization code utilized by said one or more stub procedures to invoke said plurality of service procedures;
      a plurality of selectable blocks of code, wherein each of said selectable blocks of code corresponds to at least one of said plurality of service procedures; and
      a block identifier utilized to select one of said selectable blocks of code, wherein said selected one of said selectable blocks of code and said common code are utilized to invoke one of said plurality of service procedures.

2. The memory of claim 1, wherein a particular one of said selectable blocks of code is utilized by one of said one or more stub procedures to invoke a plurality of service procedures.

3. The memory of claim 1, wherein said one or more stub procedures together comprise a single common code segment having a menu containing a plurality of selectable blocks of code, wherein a single one of said plurality of selectable blocks of code is selected from said menu for inclusion within a remote procedure call.

4. The memory of claim 1, said computer network including a local node on which said application executes, wherein said common code block is dynamically generated in response to a local call by said application.

5. A method of creating a stub file within a computer network supporting remote procedure calls, wherein said stub file includes one or more stub procedures utilized by an application to invoke a plurality of service procedures available on said computer network, said method comprising:
   generating a common code block including initialization and finalization code utilized by said one or more stub procedures to invoke said plurality of service procedures;
   providing a plurality of selectable blocks of code, wherein each of said selectable blocks of code corresponds to at least one of said plurality of service procedures; and
   selecting one of said selectable blocks of code, wherein said selected one of said selectable blocks of code and said common code block are utilized to invoke one of said plurality of service procedures.

6. The method of claim 5, wherein said selected one of said selectable blocks of code is utilized by one of said one or more stub procedures to invoke a plurality of service procedures.

7. The method of claim 5, wherein said one or more stub procedures together comprise a single common code segment having a menu containing a plurality of selectable blocks of code, and wherein said step of selecting one of said selectable blocks of code comprises the step of selecting a single one of said plurality of Selectable blocks of code from said menu for inclusion within a remote procedure call.

8. The method of claim 5, said computer network including a local node on which said application executes, wherein said step of generating a common code block comprises the step of dynamically generating said common code block in response to a local call by said application.

9. The method of claim 5, wherein said step of selecting one of said selectable blocks of code is performed in response to receipt of a block identifier from one of said one or more stub procedures.

* * * * *